US010429030B2

United States Patent
Jiang et al.

(10) Patent No.: US 10,429,030 B2
(45) Date of Patent: Oct. 1, 2019

(54) HYBRID LENS SYSTEM INCORPORATING TOTAL INTERNAL REFLECTION LENS AND DIFFUSER

(71) Applicant: LedEngin, Inc., San Jose, CA (US)

(72) Inventors: Wu Jiang, Sunnyvale, CA (US); Debo Adebiyi, Fremont, CA (US); Kevin Schneider, San Jose, CA (US)

(73) Assignee: LedEngin, Inc., San Jose, CA (US)

( * ) Notice: Subject to any disclaimer, the term of this patent is extended or adjusted under 35 U.S.C. 154(b) by 804 days.

(21) Appl. No.: 14/538,671

(22) Filed: Nov. 11, 2014

(65) Prior Publication Data

US 2016/0131330 A1    May 12, 2016

Related U.S. Application Data (60) Provisional application No. 61/903,372, filed on Nov. 12, 2013.

(51) Int. Cl.

| | |
|---|---|
| F21V 5/04 | (2006.01) |
| F21V 7/00 | (2006.01) |
| F21K 9/233 | (2016.01) |
| G02B 17/00 | (2006.01) |
| F21Y 105/10 | (2016.01) |
| F21Y 113/13 | (2016.01) |
| F21Y 115/10 | (2016.01) |

(52) U.S. Cl.
CPC .............. *F21V 5/045* (2013.01); *F21K 9/233* (2016.08); *F21V 7/0091* (2013.01); *G02B 17/006* (2013.01); *F21Y 2105/10* (2016.08); *F21Y 2113/13* (2016.08); *F21Y 2115/10* (2016.08)

(58) Field of Classification Search
CPC .......... F21V 5/008; F21V 5/045; F21V 5/046; F21V 5/048; F21K 9/137; G02B 17/006
See application file for complete search history.

(56) References Cited

U.S. PATENT DOCUMENTS

| | | |
|---|---|---|
| 8,384,097 B2 | 2/2013 | Yan |
| 8,399,268 B1 | 3/2013 | Mei et al. |
| 8,716,725 B2 | 5/2014 | Yan |
| 8,858,022 B2 | 10/2014 | Jiang et al. |
| 8,900,892 B2 | 12/2014 | Mei et al. |
| 8,993,358 B2 | 3/2015 | Mei et al. |

(Continued)

*Primary Examiner* — Mary Ellen Bowman
(74) *Attorney, Agent, or Firm* — Kilpatrick Townsend & Stockton LLP (57) ABSTRACT

A lens system includes a TIR (Total Internal Reflection) lens and a diffuser. The lens has an optical body member including an upper end, a lower end opposite the upper end, and an outer surface. The outer surface is shaped to provide total internal reflection for light from a light source. An upper surface extends in a series of steps from the upper end to a first interior portion of the optical body member. A substantially cylindrical cavity extends from the lower end to a second interior portion of the optical body member. A middle portion separates the first and second interior portions and has a flat upper surface and a curved lower surface. The diffuser has a curved shell configured for disposing over a light source and configured to fit inside the cylindrical cavity of the optical body member, the diffuser having a circular rim fused to the lower end of the optical body member.

20 Claims, 12 Drawing Sheets

(56) References Cited

U.S. PATENT DOCUMENTS

| | | | |
|---|---|---|---|
| 2012/0224363 A1* | 9/2012 | Van De Ven | F21K 9/56 362/231 |
| 2013/0120985 A1* | 5/2013 | Jiang | F21V 13/04 362/235 |
| 2014/0360766 A1 | 12/2014 | Yan | |
| 2014/0369051 A1 | 12/2014 | Jiang et al. | |

* cited by examiner

| Distance from tun (m) | Spot dim. (m) | Beam sitrain (t.s.) |
|---|---|---|
| 1.0 | 9.5 | 5.4 |
| 2.0 | 18 | 5.2 |
| 3.0 | 30 | 5.7 |

FIG. 12

HYBRID LENS SYSTEM INCORPORATING TOTAL INTERNAL REFLECTION LENS AND DIFFUSER

CROSS-REFERENCES TO RELATED APPLICATIONS

This application claims priority to U.S. Provisional Application No. 61/903,372, filed Nov. 12, 2013, which is commonly owned and incorporated herein by reference for all purposes.

This application is also related to U.S. patent application Ser. No. 13/463,735, filed May 3, 2012, which claims priority to U.S. Provisional Patent Application No. 61/483,036 filed May 5, 2011, now U.S. Pat. No. 8,858,022, U.S. patent application Ser. No. 12/756,861, filed Apr. 8, 2010, now U.S. Pat. No. 8,384,097, U.S. patent application Ser. No. 13/338,912, filed Dec. 28, 2011, and U.S. patent application Ser. No. 13/338,936, filed Dec. 28, 2011, now U.S. Pat. No. 8,399,268, all of which are commonly owned and incorporated herein by reference in their entirety.

BACKGROUND OF THE INVENTION

Embodiments of the present invention relate generally to lighting apparatus. More particularly, embodiments of the present invention relate to a hybrid lens system incorporating a total internal reflection (TIR) lens and a diffuser.

As light-emitting diode (LED)-based lighting sources become popular, more customers are demanding high-power, narrow beam light sources. For example, in some high bay lighting applications, sufficient light may need to reach 12 meters or farther, and in some stage lighting applications, sufficient light may need to reach 40 to 60 meters. There are also increasing demand for uniform color mixing, for example, for white light or colored light applications. Conventional approaches have limitations, as described in more detail below. Conventional light apparatus for generating high power often use large emitters and a reflector housing. Conventional approaches have many limitations, as described in more detail below.

Therefore, it would be desirable to provide an improved LED-based light source.

BRIEF DESCRIPTION OF THE INVENTION

The inventors of this invention have observed many limitations in conventional approaches to providing high power and narrow beam light sources. For example, as described above, conventional light apparatus for generating high power often use large emitters and a reflector housing. The reflector is needed, because it would be difficult and costly to make a very large secondary lens, e.g., a TIR secondary lens, with such large emitters. Further, it is difficult to achieve uniform color mixing using conventional designs.

Embodiments of the present invention provide a hybrid lens system incorporating a total internal reflection (TIR) lens and a diffuser. The lens system is configured for forming a lighting apparatus with a multiple-LED emitter to provide narrow beam angle spot light output with improved brightness and uniformity of color mixing. The embodiments are described below using examples of white light source, but it is understood that embodiments of this invention can also be used in other applications, for example, in colored light applications.

According to some embodiment of the present invention, a lens system includes an optical body member that has an upper end, a lower end opposite the upper end, and an outer surface. The optical body member is substantially symmetric with respect to an optical axis, and an outer surface is shaped to provide total internal reflection (TIR) for light from a light source. There is a cavity at the lower end of the optical body member. In a specific embodiment, the optical body member has a cylindrical cavity at the lower end. The lens system also includes a diffuser that has a curved shell configured for being disposed over the light source and is configured to fit inside the cavity at the lower end of the optical body member. In some embodiments, the diffuser has a circular rim fused to the lower end of the optical body member.

In an embodiment of the above lens system, the diffuser and the optical body are fused together to form an integrated lens. In another embodiment, the diffuser and the optical body both are made of PMMA (Polymethylmethacrylate). In another embodiment, the optical body member includes an upper surface extending in a series of steps from the upper end to a first interior portion of the optical body member, a substantially cylindrical cavity extending from the lower end to a second interior portion of the optical body member, and a middle portion separating the first and second interior portions of the optical body member. The middle portion having a flat upper surface and a curved lower surface.

According to some embodiments of the invention, a lens system has an optical body member that includes an upper end, a lower end opposite the upper end, and an outer surface. The optical body member is substantially symmetric with respect to an optical axis, and the outer surface being shaped to provide total internal reflection (TIR) for light from a light source. An upper surface extends in a series of steps from the upper end to a first interior portion of the optical body member. A substantially cylindrical cavity extends from the lower end to a second interior portion of the optical body member. The optical body member also has a middle portion separating the first and second interior portions, and the middle portion has a flat upper surface and a curved lower surface. In some embodiments, the lens system also includes a diffuser having a curved shell configured for being disposed over a light source and configured to fit inside the cylindrical cavity at the lower end of the optical body member. In some embodiments, the diffuser has a circular rim fused to the lower end of the optical body member. In a specific embodiment, the diffuser and the optical body both are made of PMMA (Polymethylmethacrylate). In some embodiments, the lens system includes a holder which has a convex exterior surface, a concave interior surface shaped to accommodate the optical body member, an upper opening for receiving the optical body member, and a lower opening for exposing the optical body member and the diffuser to the light source. The diffuser also has three or more support members extending from the lower opening and configured for centering the optical body member with respect to the light source.

According to some embodiments of the invention, a lighting apparatus includes an LED emitter having a plurality of LED (light-emitting diode) dies disposed on a substrate. The LED emitter including one or more LED dies configured to emit a first color, one or more LED dies configured to emit a second color, and one or more LED dies configured to emit a third color. The lighting apparatus also has a lens assembly disposed over the LED emitter. The lens assembly includes an optical body member, having an upper end, a lower end opposite the upper end, and an outer surface. The optical body member is substantially symmetric with respect to an optical axis, and the outer surface is shaped to provide total internal reflection for light from a light source. The lighting apparatus also includes a diffuser having a curved shell configured to fit inside a cylindrical cavity at the lower end of the optical body member. The diffuser is configured for being disposed over the LED emitter. In an embodiment of the above lighting apparatus, the lens assembly is configured such that the lighting apparatus provides an approximately 5-degree spot beam with a uniform color. In another embodiment, the LED emitter includes two or more red LED dies, two or more green white LED dies, and two or more blue white LED dies. In another embodiment, the diffuser has a circular rim for attaching to the lower end of the optical body member. In a specific embodiment, the diffuser and the optical body both are made of PMMA (Polymethylmethacrylate). In some embodiments, the diffuser and the optical body are fused together to form an integrated lens.

According to some embodiments of the invention, a lighting apparatus includes an LED emitter having 25 or more LED (light-emitting diode) dies disposed on a substrate. The LED emitter includes one or more LED dies configured to emit a first color, one or more LED dies configured to emit a second color, and one or more LED dies configured to emit a third color. The lighting apparatus also includes a lens system having an optical body member, which includes an upper end, a lower end opposite the upper end, and an outer surface. The optical body member is substantially symmetric with respect to an optical axis, and the outer surface is shaped to provide total internal reflection for light from a light source. The lighting apparatus also includes a diffuser having a curved shell configured for being disposed over a light source and configured to fit inside a cylindrical cavity at the lower end of the optical body member. The diffuser having a circular rim attached to the lower end of the optical body member. The lens assembly is configured such that the lighting apparatus provides a 5-degree spot beam with uniform color. In an embodiment of the above lighting apparatus, the diffuser and the optical body both are made of PMMA (Polymethylmethacrylate), and the diffuser and the optical body are fused together to form an integrated lens.

A further understanding of the nature and advantages of the present invention may be realized by reference to the remaining portions of the specification and the drawings.

DETAILED DESCRIPTION OF THE INVENTION

The present invention relates generally to lighting apparatus. More particularly, embodiments of the present invention relate to a hybrid lens system incorporating total internal reflection (TIR) lens and diffuser for providing narrow beam angle spot light output with improved brightness and uniformity.

Figure 1:
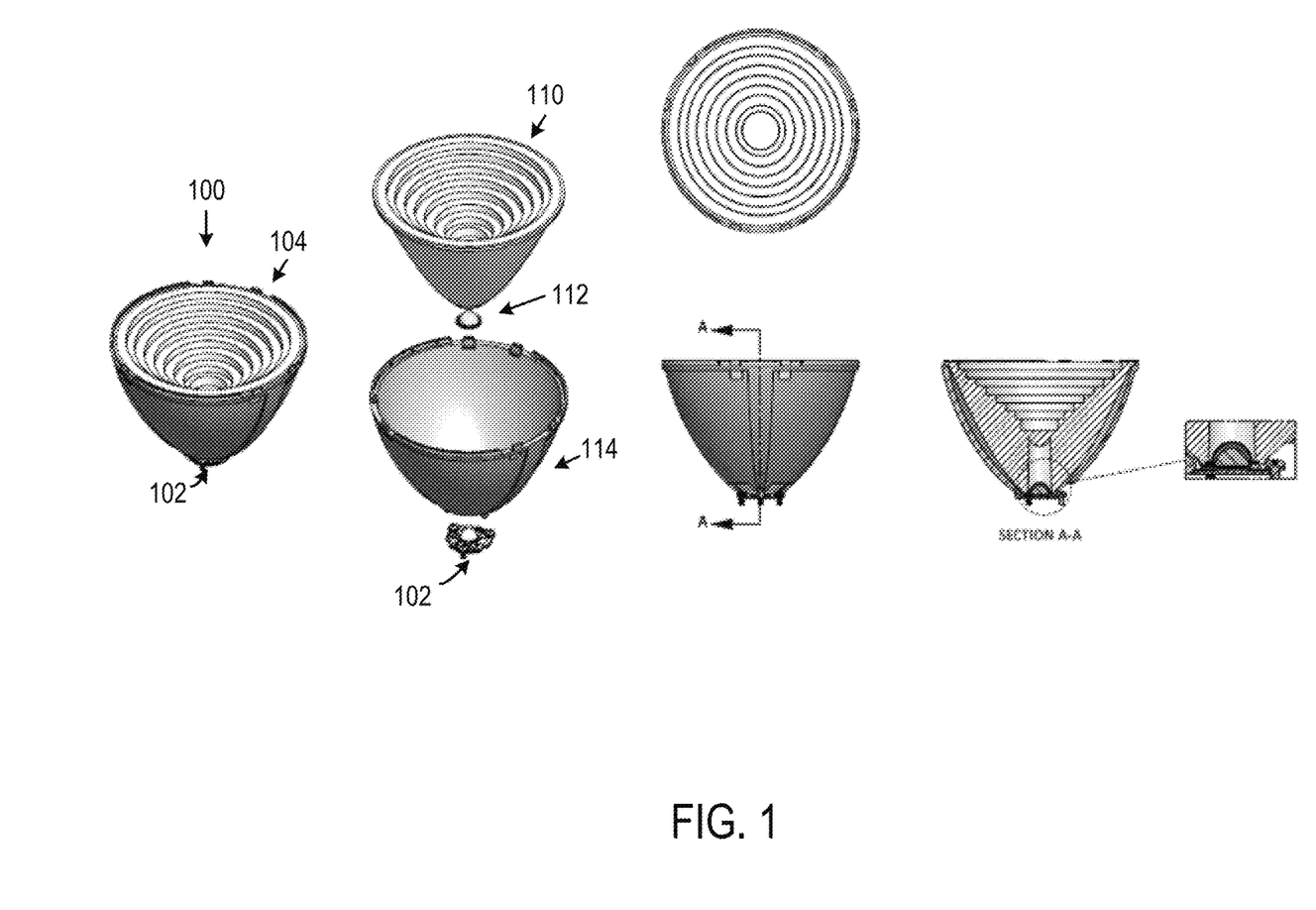
FIG. 1 shows various views of a lighting apparatus 100 according to an embodiment of the present invention.

FIG. 1 shows various views of a lighting apparatus 100 according to an embodiment of the present invention. As shown, lighting apparatus 100 includes an LED emitter 102 and a lens system 104. Lens system 104 includes an optical body member 110, a diffuser 112, and a holder 114. LED emitter 102 has a plurality of LED (light-emitting diode) dies disposed on a substrate. In some embodiments, LED emitter 102 also has a primary lens disposed over the plurality of LED dies. As will be described in more details below, optical body member 110 has an upper end, a lower end opposite the upper end, and an outer surface, the optical body member being substantially symmetric with respect to an optical axis, the outer surface being shaped to provide total internal reflection for light from a light source. Diffuser 112 has a curved shell configured for being disposed over the LED emitter and configured to fit inside a cylindrical cavity at the lower end of the optical body member. In some embodiments, the lens system is configured such that the lighting apparatus provides an approximately 5-degree spot beam with a uniform color. FIG. 1 also shows a top view, a side view, and a cross-sectional view of lighting apparatus 100.

As shown in FIG. 1, lens system 104 includes an optical body member 110 that has an upper end, a lower end opposite the upper end, and an outer surface. The optical body member is substantially symmetric with respect to an optical axis, and the outer surface being shaped to provide total internal reflection for light from a light source. The optical body member has an upper surface extending in a series of steps from the upper end to a first interior portion of the optical body member, a substantially cylindrical cavity extending from the lower end to a second interior portion of the optical body member, and a middle portion separating the first and second interior portions of the optical body member, the middle portion having a flat upper surface and a curved lower surface. Diffuser 112 has a curved shell configured for being disposed over a light source and configured to fit inside the cylindrical cavity at the lower end of the optical body member. In some embodiments, the diffuser has a circular rim fused to the lower end of the optical body member. In some embodiments, holder 114 has a convex exterior surface, a concave interior surface shaped to accommodate the optical body member, and an upper opening for receiving the optical body member, a lower opening for exposing the optical body member and the diffuser to the light source. In some embodiments, the holder has three or more support members extending from the lower opening and configured for centering the optical body member with respect to the light source.

Depending on the embodiments, the optical body member can be made of different material, e.g. glass or transparent plastic such as PMMA (Polymethylmethacrylate). Of course, other material having suitable refractive index and transparency can also be used.

Figure 2:
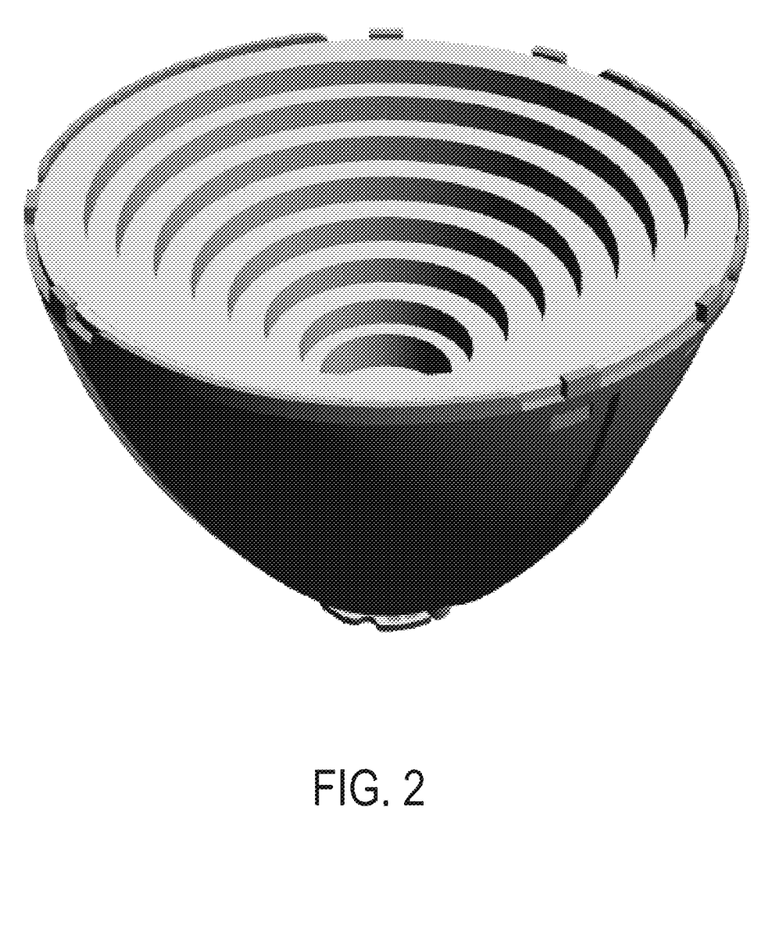
FIG. 2 shows a perspective view of the light apparatus of according to an embodiment of the present invention.

FIG. 2 shows a perspective view of the light apparatus of according to an embodiment of the present invention.

Figure 3A:
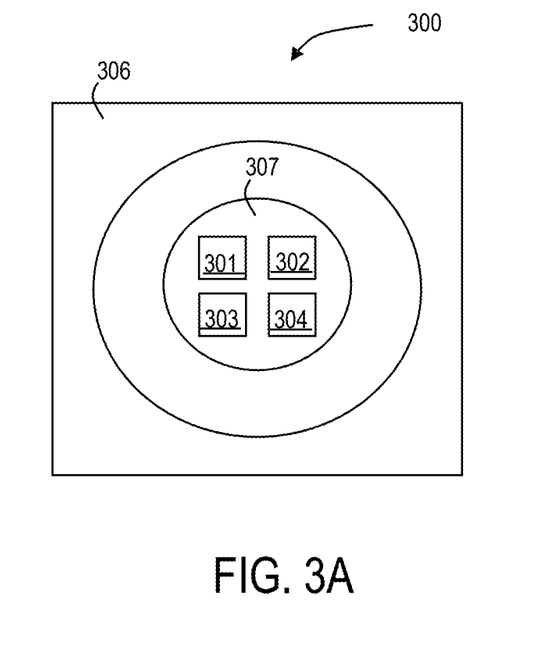
FIGS. 3A and 3B are simplified top view and cross-sectional view, respectively, of an LED-based emitter device having multiple LED dies according to an embodiment of the present invention.
Figure 3B:
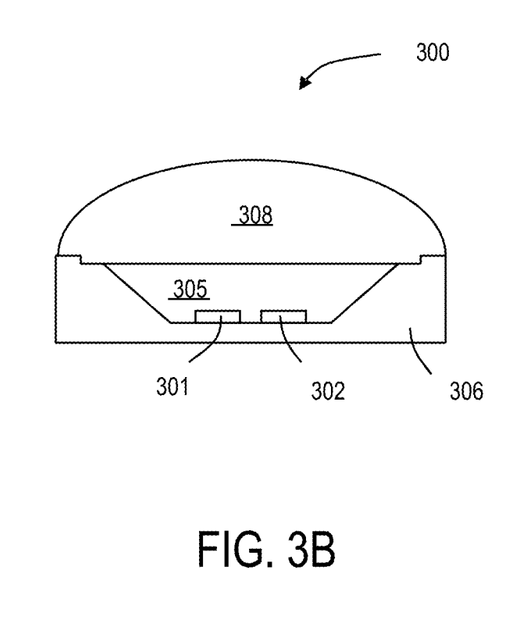

FIGS. 3A and 3B are simplified top view and cross-sectional view, respectively, of an LED-based emitter device 300 having multiple LED dies according to an embodiment of the present invention. As shown in FIG. 3A, four LED dies 301-304 are disposed in a recess 307 on substrate 306. As shown in FIG. 3B, a light-converting material 305, such as phosphor, is deposited over the LED dies. For example, for a white light device, LED dies 301-304 may be blue LEDs, and light-converting material 305 may be a yellow phosphor. Additionally, a primary lens 308 may be disposed over the LEDs.

Figure 4:
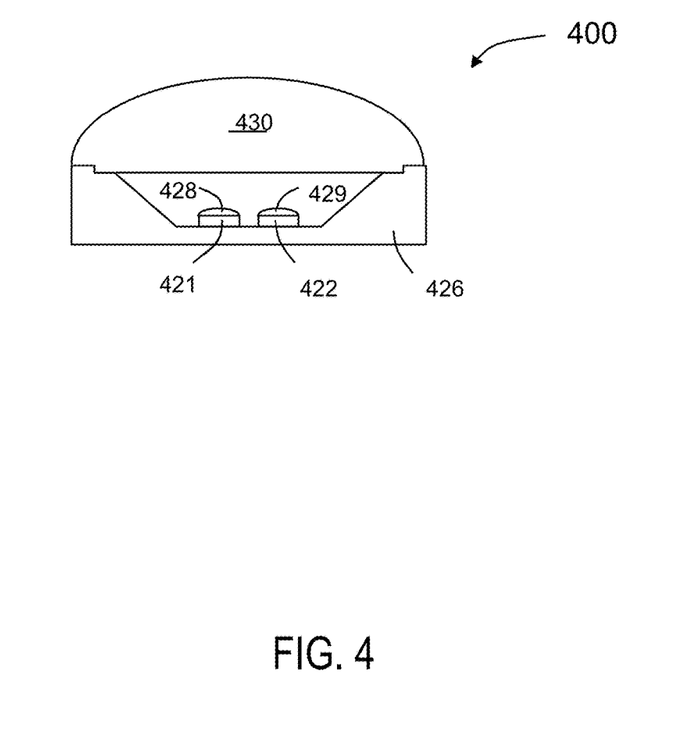
FIG. 4 shows another LED-based lighting device having multiple LED dies according to another embodiment of the present invention.

FIG. 4 shows another LED-based lighting device, or emitter, 400 having multiple LED dies, of which LED dies 421 and 422 are shown. Each LED die has a light-converting material, e.g., 428 and 429, deposited thereon. Lighting device 400 also has a primary lens 430. The light-converting material, containing a wavelength-shifting material such as phosphor, is deposited over the top surface of each LED, and the side surfaces of the LED are substantially free of the phosphor-containing material. In other embodiments, the LED dies may be LED dies configured for emitting light of different colors, for example, red LEDs, green LEDs, and blue LEDs that may or may not have a light-converting material overlying the LEDs.

Figure 5:
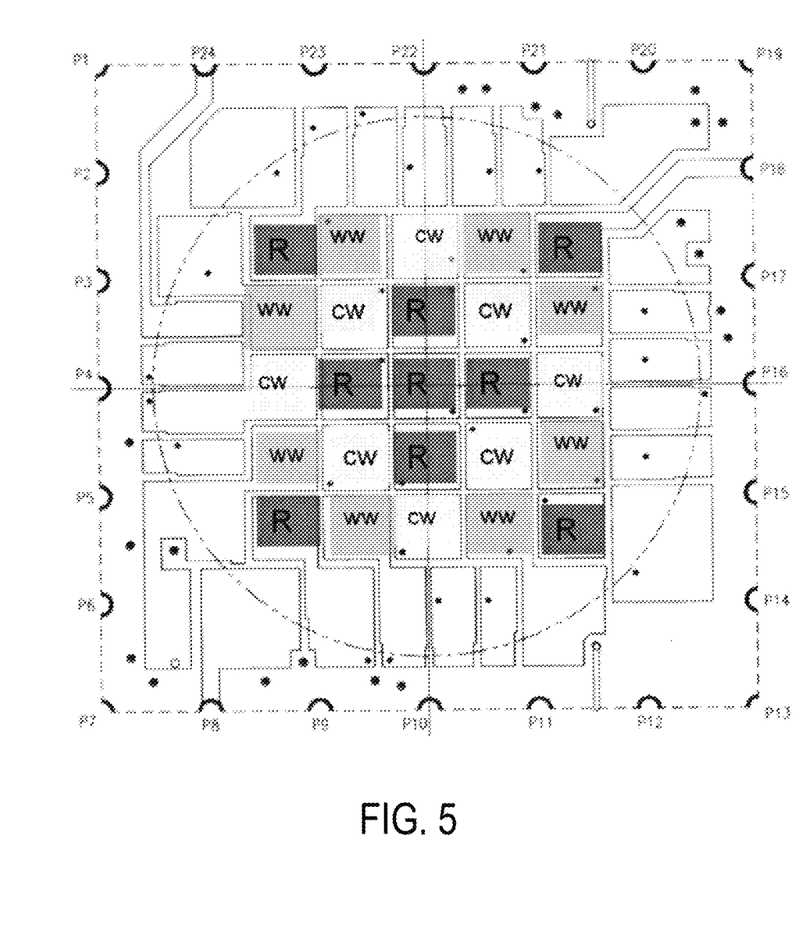
FIG. 5 shows a top view of an LED-based light source according to another embodiment of the present invention.

FIG. 5 shows a top view of an LED-based light source according to another embodiment of the present invention. As shown, this LED-based light source has 25 LED dies having different colors, for example, red (R), cool white (CW), and warm white (WW). In some embodiments, the cool white and warm white LED dies include a light-conversion layer overlying a blue LED. In other embodiments, the LED dies may be LED dies configured for emitting light of different colors, for example, red LEDs, green white LEDs, and blue white LEDs that may or may not have a light-converting material overlying the LEDs. For example, in an embodiment, the light source can have nine red LED dies, eight green white LED dies, and eight blue white LED dies. In embodiments of the present invention, green white and blue white both are blue LED dies with phosphors on top. By applying different phosphors, their spectrums are weighted on green or blue. By controlling the intensity of these blue white and greet white dies, along with other colored dies if needed, a wide range of CCT (correlated color temperature) in with high CRI (color rendering index) can be generated. In alternative embodiments, the 25-die emitter may have LEDs having four different colors, red, green, blue, and white (RGBW).

Figure 6:
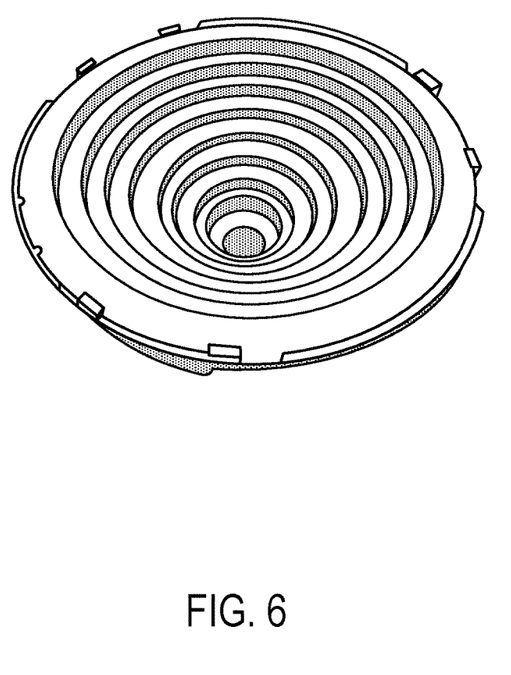
FIG. 6 shows a top perspective view of a lens according to an embodiment of the present invention.

FIG. 6 shows a top perspective view of a lens according to an embodiment of the present invention. A detailed description is provided below in connection with FIG. 7.

Figure 7:
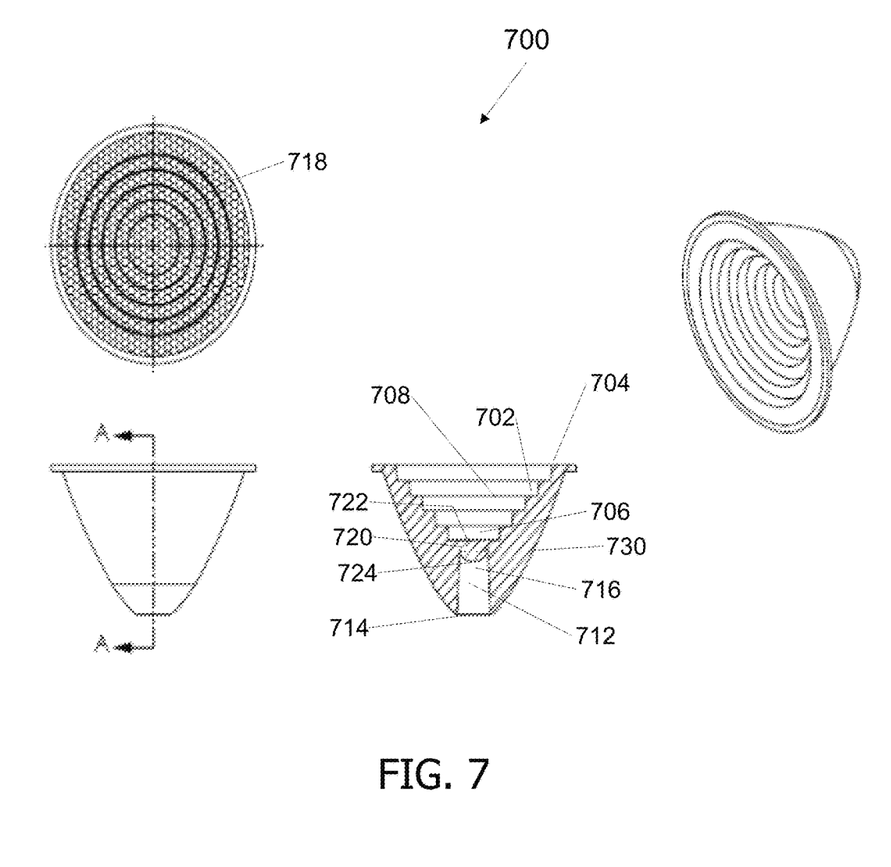
FIG. 7 shows a cross-sectional view, a top view, a side view, and a bottom view of an optical body member of a lens according to an embodiment of the present invention.

FIG. 7 shows a cross-sectional view, a top view, a side view, and a bottom view of an optical body member 700 of a lens according to an embodiment of the present invention. As shown the lens body 700 has an upper surface 702 extending in a series of steps from the upper end 704 to a first interior portion 706 of the optical body member. The step-shaped upper surface 702 defining an increasingly wider cavity 808 extending from first interior portion 706 to an upper opening in of the optical body. Optical body member 800 also has a substantially cylindrical lower cavity 712 extending from the lower end 714 to a second interior portion 716 of the optical body member, and a middle portion 720 separating the first and second interior portions of the optical body member. The middle portion 720 has a flat upper surface 722 and a curved lower surface 724. In some embodiments, the curved lower surface 724 is spherical. According to embodiments of the present invention, the outer surface 730 of the lens is shaped to provide total internal reflection of light originating from a light source. In some embodiments, the top surface of each step 702 can have a plurality of refractive surface regions or micro lenses 718. In a specific embodiment, the upper interior surface has eight steps, and the lens is 120 mm in diameter and 80 mm in height. The diameter of the lower end is about 21 mm for accommodating a 25-die LED emitter.

According to embodiments of the present invention, the outer surface the lens is shaped to provide total internal reflection of light originating from a light source. In some embodiments, the shape of outer surface can be described by the following equation.

$$z = \frac{cr^2}{1 + \sqrt{1 - (1+k)c^2r^2}} \quad (1)$$

where z denotes the longitudinal coordinate, and r is the radius measured from the optical axis. Curvature parameters k and c can be varied, e.g., based on a particular configuration of LEDs, to optimize total internal reflection. Light from the source entering the lens from the bottom opening that strikes the TIR surface is internally reflected and, therefore, is largely prevented from escaping out the side of the lens.

Figure 8:
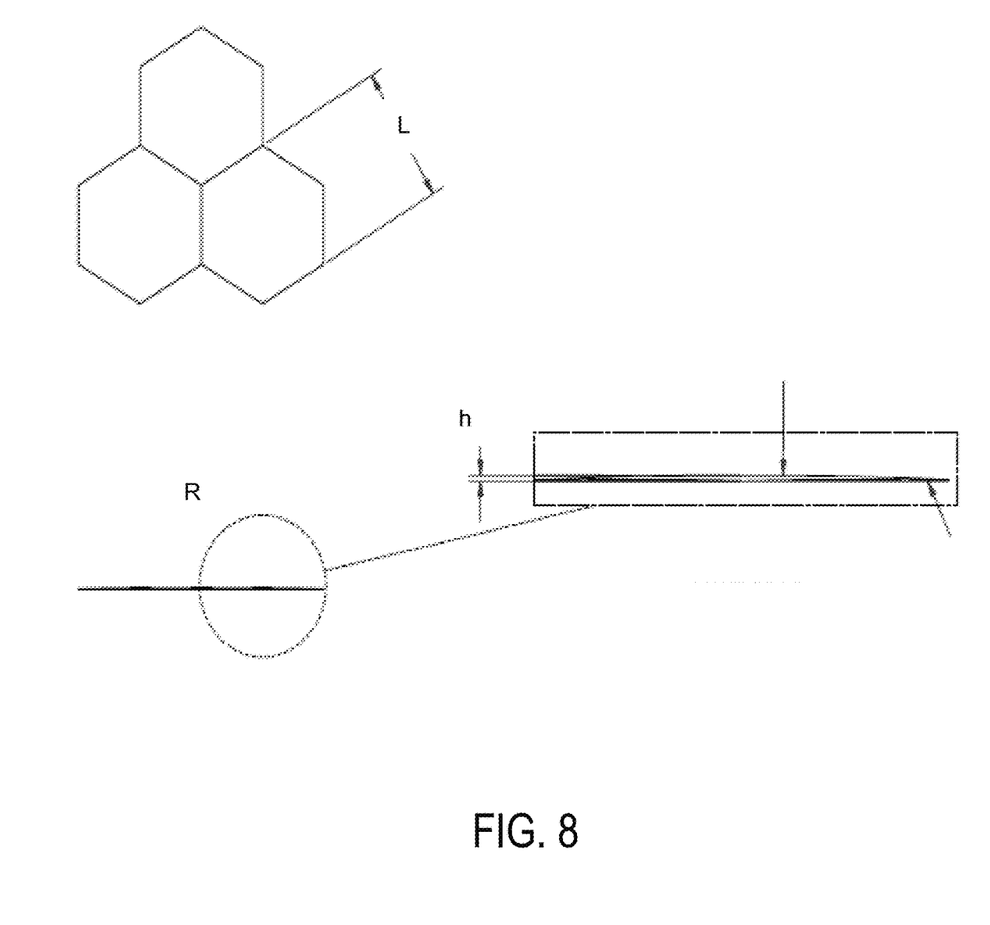
FIG. 8 shows a top view and a cross-sectional view of a portion of the micro lenses according to an embodiment of the present invention.

FIG. 8 shows a top view and a cross-sectional view of a portion of the micro lenses in which a micro lens has a radius R and a height h. The top view of the micro lens shows hexagonal shaped regions having a lateral dimensional L. According to embodiments of the present invention, the micro lenses can help to provide different beam widths by varying the parameters such as R (radius of curvature of the top surface of the micro lens), h (height or thickness of the micro lens, and L (lateral dimension of the hexagon). In various embodiments, lenses are configured to provide wide, medium, or narrow beam widths to suit different applications. For example, in one embodiment, the micro lens configuration shown in FIG. 11 is used with the optical body member described above to achieve a narrow beam having a beam angle of about 5-6 degrees.

Figure 9:
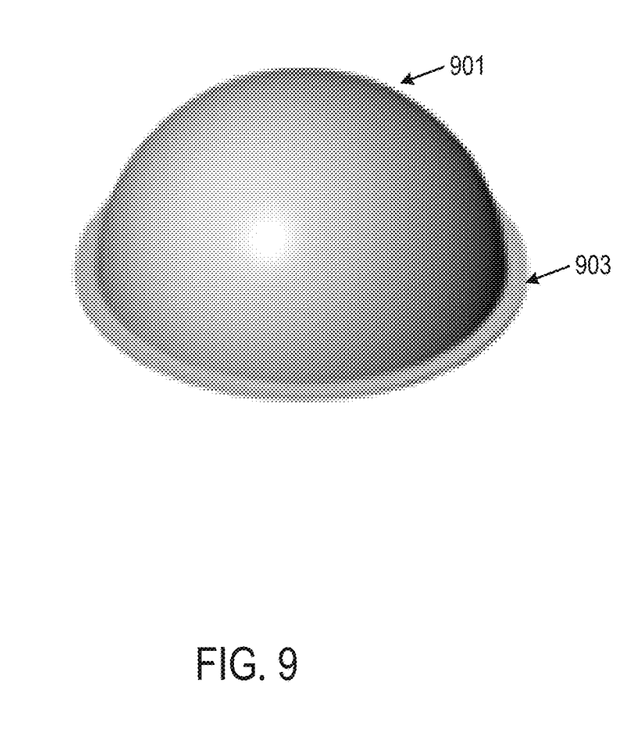
FIG. 9 shows a perspective view of a diffuser according to an embodiment of the present invention.

FIG. 9 shows a perspective view of a diffuser according to an embodiment of the present invention. Depending on the embodiments, the diffuser can be made of different material, e.g. translucent plastic such as PMMA (Polymethylmethacrylate). Of course, other material having suitable refractive index and transparency can also be used. As shown in FIG. 9, the diffuser has a curved shell and a rim. In some embodiments, the curved shell has a spherical shape. The size of the diffuser is selected to fit over the LED emitter, and provide adequate spacing from the primary lens of the emitter. The spacing is selected to separate the diffuser from the heat generated by the emitter to prevent degradation of the diffuser material. For example, for the 25-die emitter described above, the base of the curved shell of the diffuser may have a diameter of about 12-16 mm, and the dome may have a diameter of 5-7 mm. In some embodiments, the shell of the diffuser may have a thickness range of about 0.3 to 1.0 mm. The thickness of the diffuser serves as a volume diffuser, through which light can be bounced back forward inside the shell, and provide mixing of light of different colors from the emitter. The inventors have noticed that it is difficult to achieve good color mixing using only optical method, when a bright LED light source, such as the 25-die emitter, is focused into a small beam angle to form a spot light. In embodiments of the invention, the light from the emitter is mixed well by the diffuser before the light is collimated by the lens body. Embodiments of the invention can achieve a narrow angle and high quality color and intensity uniformity. The rim of the diffuser can be used to fuse the diffuser to the bottom of the optical body member of the lens to form a hybrid lens system with the lens and diffuser. The bottom of the hybrid lens system is configured to fit over an LED emitter described earlier.

Figure 10:
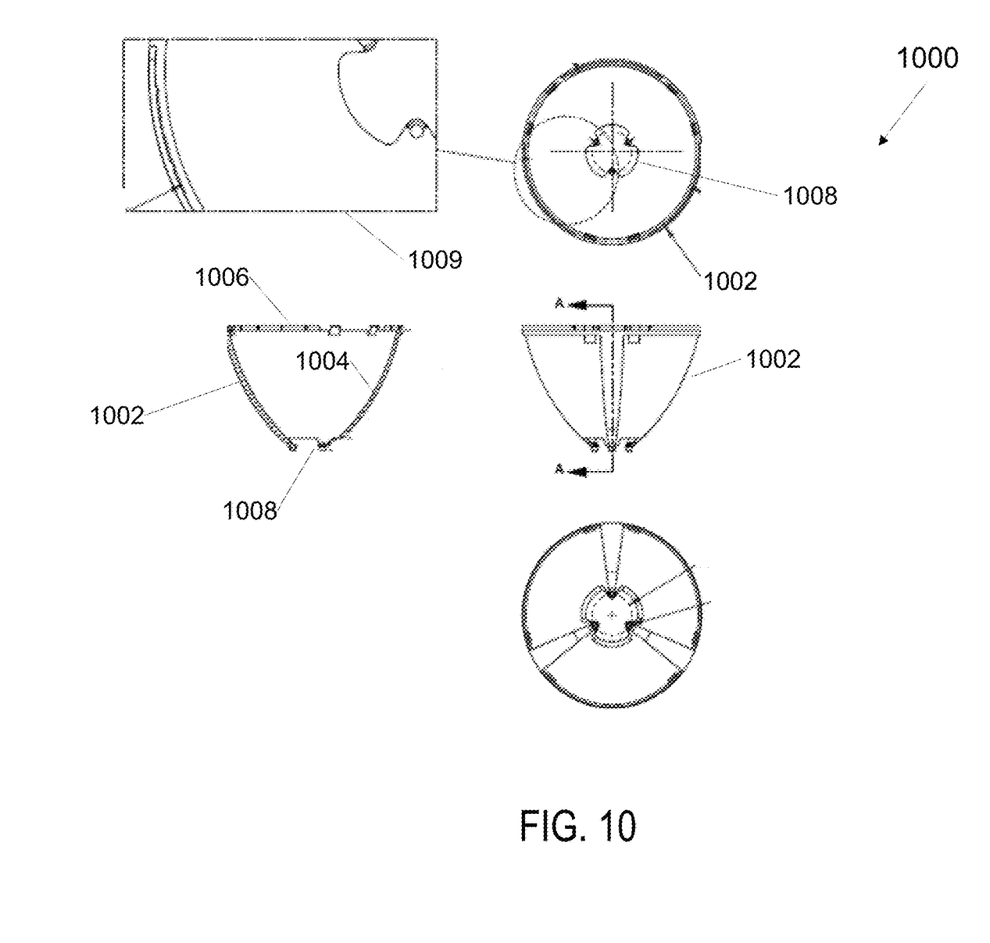
FIG. 10 shows various views of a holder according to an embodiment of the present invention.

FIG. 10 shows various views of a holder according to an embodiment of the present invention. As shown in FIG. 10, the holder has a convex exterior surface 1002, a concave interior surface 1004 shaped to accommodate the optical body member of the lens. The lens also has an upper opening 1006 for receiving the optical body member, a lower opening 1008 for exposing the optical body member and the diffuser to a light source (not shown). The lens also has three or more support members extending from the lower opening 1008 and configured for centering the optical body member with respect to the light source. A magnified view of a portion of the holder is also shown as 1009.

Figure 11:
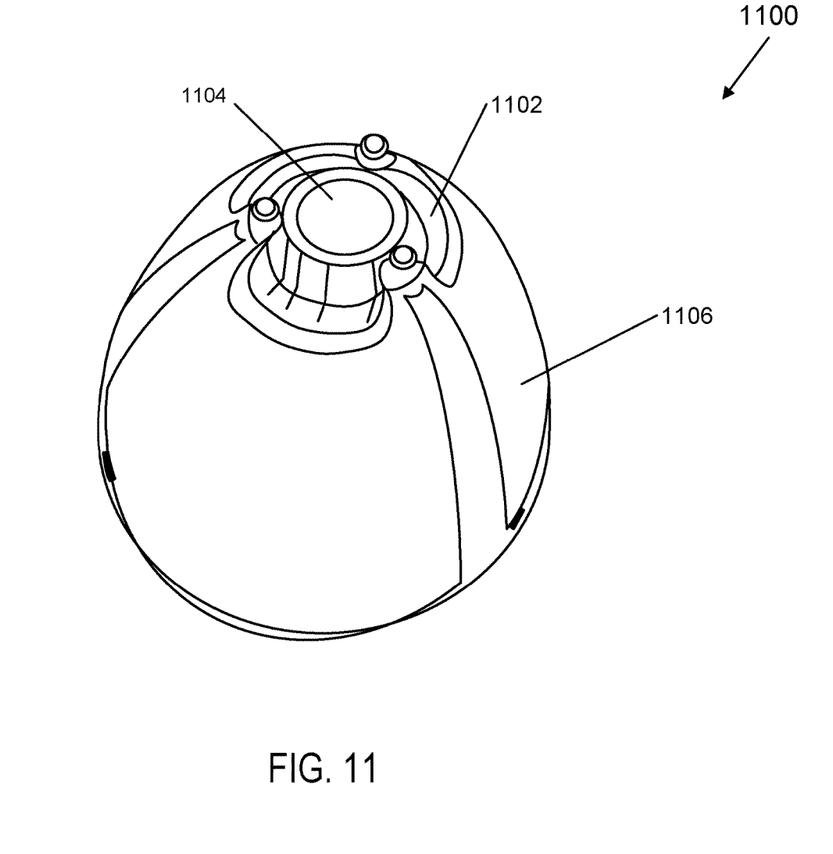
FIG. 11 shows a bottom perspective view of a lens system including the optical body member, the diffuser, and the holder according to embodiments of the invention.

FIG. 11 shows a bottom perspective view of a lens system 1100 including an optical body member 1002, a diffuser 1104, and a holder 1106 according to embodiments of the invention. In the embodiment shown in FIG. 11, the diffuser and the optical body are made separately, and then assembled together. In some embodiments, both the optical body member and the diffuser are made of PMMA, and the optical body member and the diffuser are fused together at a high temperature. The lens system is configured to be disposed over an emitter. As described above, the combination of the TIR lens and the diffuser provide narrow bean angle with uniform color mixing for a multiple-LED emitter.

Figure 12:
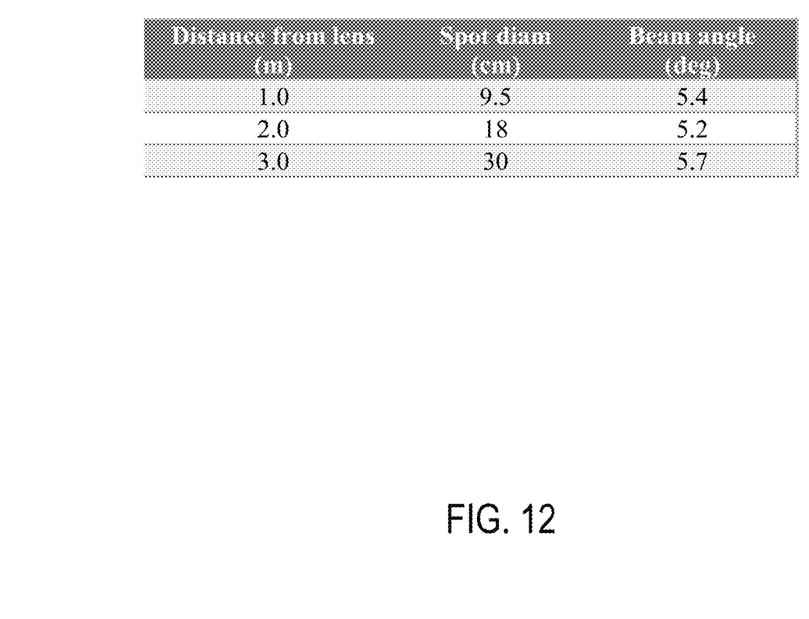
FIG. 12 shows a table that lists the spot sizes at different distances of a light apparatus according to an embodiment of the invention.

FIG. 12 shows a table that lists the spot sizes at different distances of a light apparatus according to an embodiment of the invention. The data is taken from a lighting apparatus having a hybrid lens system with an optical body member and a diffuser fused together, and the lens system is disposed over a 25-die emitter. As described above, the emitter includes LED dies of red, green, and blue colors. However, in the lighting apparatus, no separation of the colors in the spot beam is observed. As shown in the table of FIG. 12, the beam angle is about 5-6 degrees. In this embodiment, the lens is 120 mm in diameter and 80 mm in height, and provides an approximately five degree spot beam with superb color uniformity. Thus, the lens system with the 25-die LED emitter according to embodiments of the invention can provide narrow beam spot light with uniform light with high brightness. Besides the low energy and high efficiency of the LED light source, the emitter is tunable for providing different light color and brightness.

While certain embodiments of the invention have been illustrated and described, those skilled in the art with access to the present teachings will recognize that the invention is not limited to these embodiments only. Numerous modifications, changes, variations, substitutions, and equivalents will be apparent to those skilled in the art. Accordingly, it is to be understood that the invention is intended to cover all variations, modifications, and equivalents within the scope of the following claims.

What is claimed is:

1. A lens system, comprising:
an optical body member, having an upper end, a lower end opposite the upper end, and an outer surface, the optical body member being substantially symmetric with respect to an optical axis, the lower end of the optical body member including a cavity for accommodating a light source, the outer surface being shaped to provide total internal reflection (TIR) for light from the light source; and
a diffuser, having a curved shell and a circular rim, the diffuser being configured for being disposed over the light source and configured to fit inside the cavity at the lower end of the optical body member;
wherein light from the light source is mixed by the diffuser and collimated by the optical body member to form a spot light.

2. The lighting apparatus of claim 1, wherein the diffuser and the optical body are fused together to form an integrated lens.

3. The lens system of claim 1, wherein the diffuser and the optical body both are made of PMMA (Polymethylmethacrylate).

4. The lens system of claim 1, wherein the optical body member comprises:
an upper surface extending in a series of steps from the upper end to a first interior portion of the optical body member,
a substantially cylindrical cavity extending from the lower end to a second interior portion of the optical body member; and
a middle portion separating the first and second interior portions of the optical body member, the middle portion having a flat upper surface and a curved lower surface.

5. A lens system, comprising:
an optical body member having:
an upper end, a lower end opposite the upper end, and an outer surface, the optical body member being substantially symmetric with respect to an optical axis, the outer surface being shaped to provide total internal reflection (TIR) for light from a light source,
an upper surface extending in a series of steps from the upper end to a first interior portion of the optical body member,
a substantially cylindrical cavity extending from the lower end to a second interior portion of the optical body member, and
a middle portion separating the first and second interior portions of the optical body member, the middle portion having a flat upper surface and a curved lower surface;
a diffuser having a curved shell configured for being disposed over a light source and configured to fit inside the cylindrical cavity at the lower end of the optical body member, the diffuser having a circular rim; and
a holder having:
a convex exterior surface;
a concave interior surface shaped to accommodate the optical body member;
an upper opening for receiving the optical body member;

a lower opening for exposing the optical body member and the diffuser to the light source; and three or more support members extending from the lower opening and configured for centering the optical body member with respect to the light source.

6. The lens system of claim 5, wherein the diffuser and the optical body are fused together to form an integrated lens.

7. The lens system of claim 5, wherein the diffuser and the optical body both are made of PMMA (Polymethylmethacrylate).

8. A lens system, comprising:
an optical body member having:
an upper end, a lower end opposite the upper end, and an outer surface, the optical body member being substantially symmetric with respect to an optical axis, the outer surface being shaped to provide total internal reflection for light from a light source,
an upper surface extending in a series of steps from the upper end to a first interior portion of the optical body member,
a substantially cylindrical cavity extending from the lower end to a second interior portion of the optical body member, and
a middle portion separating the first and second interior portions of the optical body member, the middle portion having a flat upper surface and a curved lower surface.

9. The lens system of claim 8, further comprising a diffuser, wherein a diffuser having a curved shell and a circular rim, the diffuser being configured for being disposed over a light source and configured to fit inside the cylindrical cavity at the lower end of the optical body member.

10. The lens system of claim 9, further comprising a holder having:
a convex exterior surface;
a concave interior surface shaped to accommodate the optical body member;
an upper opening for receiving the optical body member;
a lower opening for exposing the optical body member and the diffuser to the light source; and
three or more support members extending from the lower opening and configured for centering the optical body member with respect to the light source.

11. The lens system of claim 10, wherein the diffuser and the optical body are fused together to form an integrated lens.

12. The lens system of claim 10, wherein the diffuser and the optical body both are made of PMMA (Polymethylmethacrylate).

13. A lighting apparatus, comprising:
an LED emitter having a plurality of LED (light-emitting diode) dies disposed on a substrate, the LED emitter including one or more LED dies configured to emit a first color, one or more LED dies configured to emit a second color, and one or more LED dies configured to emit a third color; and
a lens assembly disposed over the LED emitter, the lens assembly comprising:
an optical body member, having an upper end, a lower end opposite the upper end, and an outer surface, the optical body member being substantially symmetric with respect to an optical axis, the outer surface being shaped to provide total internal reflection for light from a light source; and
a diffuser, having a curved shell configured to fit inside a cylindrical cavity at the lower end of the optical body member, the diffuser being configured for being disposed over the LED emitter;
wherein light from the LED emitter is mixed by the diffuser and collimated by the optical body member to form a spot light.

14. The lighting apparatus of claim 13, wherein the lens assembly is configured such that the lighting apparatus provides an approximately 5-degree spot beam with a uniform color.

15. The lighting apparatus of claim 13, wherein the LED emitter includes two or more red LED dies, two or more green white LED dies, and two or more blue white LED dies.

16. The lighting apparatus of claim 13, wherein the diffuser has a circular rim for attaching to the lower end of the optical body member.

17. The lighting apparatus of claim 13, wherein the diffuser and the optical body both are made of PMMA (Polymethylmethacrylate).

18. The lighting apparatus of claim 17, wherein the diffuser and the optical body are fused together to form an integrated lens.

19. A lighting apparatus, comprising:
an LED emitter having 25 or more LED (light-emitting diode) dies disposed on a substrate, the LED emitter including one or more LED dies configured to emit a first color, one or more LED dies configured to emit a second color, and one or more LED dies configured to emit a third color; and
a lens system comprising:
an optical body member, having an upper end, a lower end opposite the upper end, and an outer surface, the optical body member being substantially symmetric with respect to an optical axis, the outer surface being shaped to provide total internal reflection for light from a light source; and
a diffuser, having a curved shell configured for being disposed over a light source and configured to fit inside a cylindrical cavity at the lower end of the optical body member, the diffuser having a circular rim attached to the lower end of the optical body member;
wherein light from the LED emitter is mixed by the diffuser and collimated by the optical body member to form a spot light;
wherein the lens system is configured such that the lighting apparatus provides a 5-degree spot beam with uniform color.

20. The lighting apparatus of claim 19, wherein the diffuser and the optical body both are made of PMMA (Polymethylmethacrylate), and the diffuser and the optical body are fused together to form an integrated lens.

* * * * *

UNITED STATES PATENT AND TRADEMARK OFFICE
CERTIFICATE OF CORRECTION

PATENT NO. : 10,429,030 B2  
APPLICATION NO. : 14/538671  
DATED : October 1, 2019  
INVENTOR(S) : Wu Jiang et al.

Page 1 of 1

It is certified that error appears in the above-identified patent and that said Letters Patent is hereby corrected as shown below:

On the Title Page

Item [60], insert:
--Provisional application No. 61/903,372, filed Nov. 12, 2013.--

Signed and Sealed this  
Third Day of March, 2020

Andrei Iancu  
*Director of the United States Patent and Trademark Office*